(12) United States Patent
Levesque et al.

(10) Patent No.: US 10,613,627 B2
(45) Date of Patent: Apr. 7, 2020

(54) SYSTEMS AND METHODS FOR PROVIDING HAPTIC FEEDBACK FOR REMOTE INTERACTIONS

(71) Applicant: IMMERSION CORPORATION, San Jose, CA (US)

(72) Inventors: Vincent Levesque, Montreal (CA); Ali Modarres, San Jose, CA (US); Danny A. Grant, Laval (CA); Jean Francois Dionne, Montreal (CA); David M. Birnbaum, Oakland, CA (US)

(73) Assignee: Immersion Corporation, San Jose, CA (US)

( * ) Notice: Subject to any disclaimer, the term of this patent is extended or adjusted under 35 U.S.C. 154(b) by 913 days.

(21) Appl. No.: 14/275,216

(22) Filed: May 12, 2014

(65) Prior Publication Data
US 2015/0323993 A1    Nov. 12, 2015

(51) Int. Cl.
*G06F 3/01* (2006.01)
*G02B 27/01* (2006.01)
*G06T 19/00* (2011.01)

(52) U.S. Cl.
CPC ......... *G06F 3/016* (2013.01); *G02B 27/0172* (2013.01); *G06F 3/012* (2013.01);
(Continued)

(58) Field of Classification Search
CPC combination set(s) only.
See application file for complete search history.

(56) References Cited

U.S. PATENT DOCUMENTS

| 8,279,052 B2 | 10/2012 | Heubel et al. |
| 9,245,428 B2 | 1/2016 | Weddle et al. |

(Continued)

FOREIGN PATENT DOCUMENTS

| CN | 101711923 A | 5/2010 |
| CN | 103576856 A | 2/2014 |

(Continued)

OTHER PUBLICATIONS

Heun, V., et al., "Smarter Objects: Using AR Technology to Program Physical Objects and their Interactions," CHI 2013 Extended Abstracts, Apr. 27-May 2, 2013, Paris, France, pp. 2939-2942.

(Continued)

*Primary Examiner* — Robin J Mishler
(74) *Attorney, Agent, or Firm* — Kilpatrick Townsend & Stockton LLP

(57) ABSTRACT

A system includes a first electronic device and a second electronic device. The first electronic device includes a sensor configured to sense or property experienced by the first electronic device, and a transmitter configured to transmit a signal based on output from the sensor. The second electronic device is in signal communication with the first electronic device. The second electronic device includes a receiver configured to receive the transmitted signal, a detector configured to determine an object that a user of the second device is focusing on, a processor configured to generate a haptic signal representative of the transmitted signal if it is determined that the object the user is focusing on corresponds with a location of the first electronic device, and a haptic output device configured to receive the haptic signal and generate a haptic effect to the user.

21 Claims, 7 Drawing Sheets

(52) U.S. Cl.
CPC .............. *G06F 3/013* (2013.01); *G06F 3/017* (2013.01); *G06T 19/006* (2013.01)

(56) References Cited

U.S. PATENT DOCUMENTS

| | | | |
|---|---|---|---|
| 9,625,905 | B2 | 4/2017 | Rosenberg |
| 2002/0142701 | A1 | 10/2002 | Rosenberg |
| 2010/0306647 | A1* | 12/2010 | Zhang .................... G06F 3/016 715/701 |
| 2012/0044365 | A1* | 2/2012 | Shuster ............... G02B 27/017 348/207.1 |
| 2013/0030571 | A1 | 1/2013 | Ruiz Morales et al. |
| 2013/0147686 | A1* | 6/2013 | Clavin ................... G06F 3/013 345/8 |
| 2013/0328762 | A1* | 12/2013 | McCulloch .......... G02B 27/017 345/156 |
| 2014/0055251 | A1 | 2/2014 | Son et al. |
| 2015/0145656 | A1 | 5/2015 | Levesque et al. |

FOREIGN PATENT DOCUMENTS

| | | |
|---|---|---|
| EP | 2 693 284 A2 | 2/2014 |
| JP | 2004-532066 | 10/2004 |
| JP | 2010-015360 | 1/2010 |
| JP | 2014-033445 | 2/2014 |

OTHER PUBLICATIONS

Extended European Search Report as issued in European Patent Application No. 15167232.6, dated Sep. 25, 2015.
CN 201510233930.6 , "Office Action", dated Sep. 29, 2018, 24 pages.
JP 2015-093941, "Office Action", dated Dec. 4, 2018, 8 pages.
JP 2015-093941, "Notice of Allowance," dated Oct. 11, 2019, 6 pages.
EP15167232.6 , "Office Action", dated Oct. 23, 2019, 7 pages.

* cited by examiner

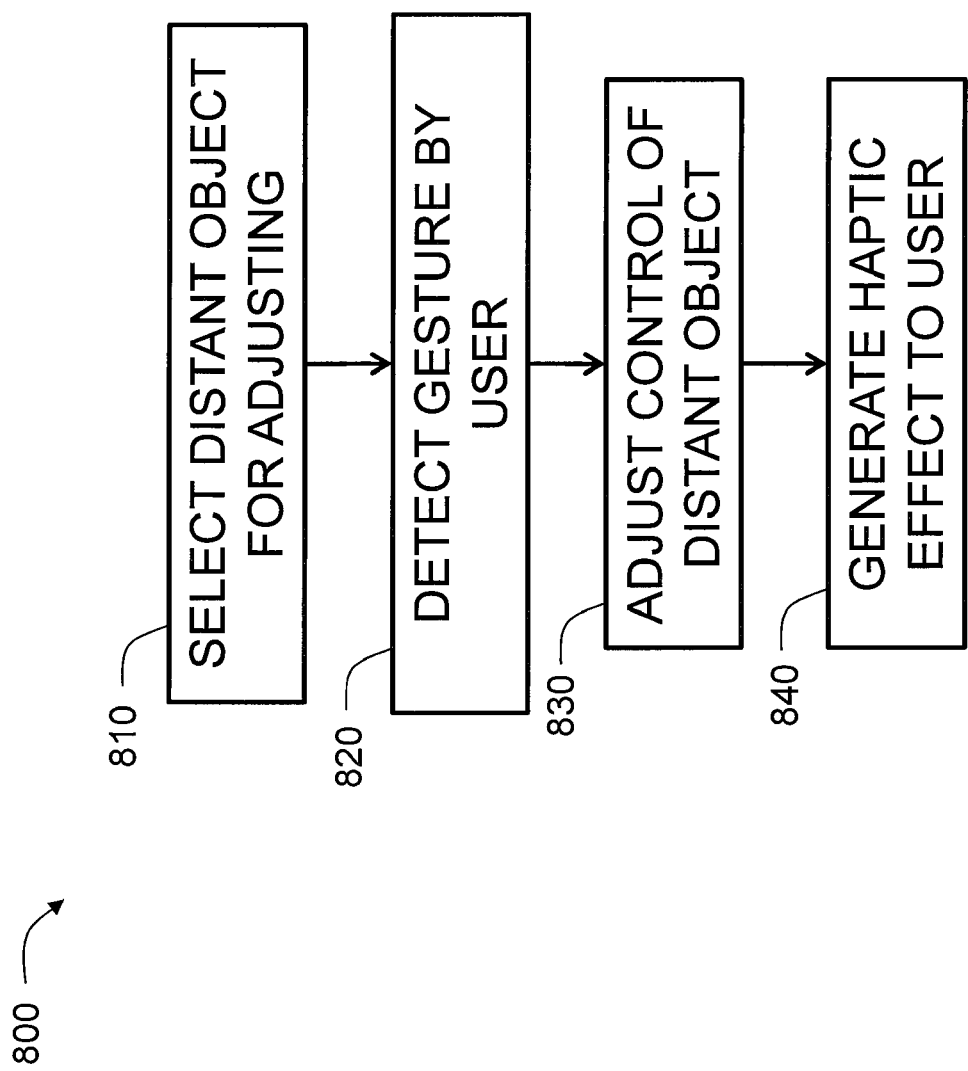

SYSTEMS AND METHODS FOR PROVIDING HAPTIC FEEDBACK FOR REMOTE INTERACTIONS

FIELD

The present invention is directed to systems and methods for providing haptic feedback for remote interactions.

BACKGROUND

Interacting with remote objects that are out of reach is currently limited to sight and sound, which limits the interaction. Being able to feel or interact with distant objects that are out of reach would be more engaging than simply looking at and/or hearing the objects.

SUMMARY

It is desirable to use haptic feedback to remotely feel or interact with distant objects that are visible, but out of reach.

According to an aspect of the invention, there is provided a system that includes a first electronic device and a second electronic device. The first electronic device includes a sensor configured to sense a condition or property experienced by the first electronic device, and a transmitter configured to transmit a signal based on output from the sensor. The second electronic device is in signal communication with the first electronic device. The second electronic device includes a receiver configured to receive the transmitted signal, a detector configured to determine an object that a user of the second device is focusing on, a processor configured to generate a haptic signal representative of the transmitted signal if it is determined that the object the user is focusing on corresponds with a location of the first electronic device, and a haptic output device configured to receive the haptic signal and generate a haptic effect to the user.

In an embodiment, the detector includes a camera configured to capture an image of an eye of the user, and an image processor configured to determine the direction of an eye gaze of the user based on the image.

In an embodiment, the sensor is configured to sense vibrations or deformations. In an embodiment, the haptic effect simulates the sensed vibrations or deformations.

In an embodiment, the first electronic device includes a camera configured to output a video stream that is part of the transmitted signal, and the second electronic device further includes a display configured to display the video stream.

In an embodiment, the second electronic device is a head-mounted display. In an embodiment, the detector comprises a camera mounted on the head-mounted display and the camera has a field of view aligned with a direction the head-mounted display is pointing.

According to an aspect of the invention, there is provided a method that includes selecting a distant object, detecting a signal transmitted by the object, the signal comprising a driving signal for a haptic output device, and generating a haptic effect to a user with the haptic output device based on the driving signal.

In an embodiment, selecting a distant object includes detecting that the user is within a predefined proximity range of the distant object.

In an embodiment, selecting a distant object includes detecting an eye gaze of the user looking at the distant object.

In an embodiment, the method includes sensing vibrations. The signal emitted from the object is based on the sensed vibrations.

In an embodiment, the signal transmitted by the object includes a video stream, and the method includes displaying the video stream to the user.

According to an aspect of the invention, there is provided a system that includes a first electronic device and a second electronic device. The first electronic device includes an adjuster configured to adjust a control of the first electronic device, and a transmitter configured to transmit a signal associated with an adjustment of the control. The second electronic device is in signal communication with the first electronic device. The second electronic device includes a receiver configured to receive the transmitted signal, a detector configured to detect a user input for adjusting the control, a processor configured to generate a haptic signal representative of the transmitted signal if the detector detects the user input for adjusting the control, and a haptic output device configured to receive the haptic signal and generate a haptic effect to the user, the haptic effect representative of the adjustment of the control.

In an embodiment, the detector is configured to detect a gesture by the user representative of movement of the adjuster.

In an embodiment, the second electronic device includes a display configured to display a virtual image of the first electronic device, and the gesture by the user is made relative to the virtual image.

In an embodiment, the second electronic device is a head-mounted display.

According to an aspect of the invention, there is provided a method that includes selecting a distant object comprising an adjuster for adjusting a control of the distant object, detecting a gesture made by the user to adjust the control of the distant object, adjusting the control of the distant object, and generating a haptic effect representative of the adjustment to the user.

In an embodiment, the method includes displaying a virtual image of the selected distant object to the user, and the gesture made by the user is made relative to the virtual image of the selected object.

These and other aspects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

The components of the following Figures are illustrated to emphasize the general principles of the present disclosure and are not necessarily drawn to scale. Reference characters designating corresponding components are repeated as necessary throughout the Figures for the sake of consistency and clarity.

FIG. 8 is a flow chart of a method in accordance with embodiments of the invention.

DETAILED DESCRIPTION

Figure 1:
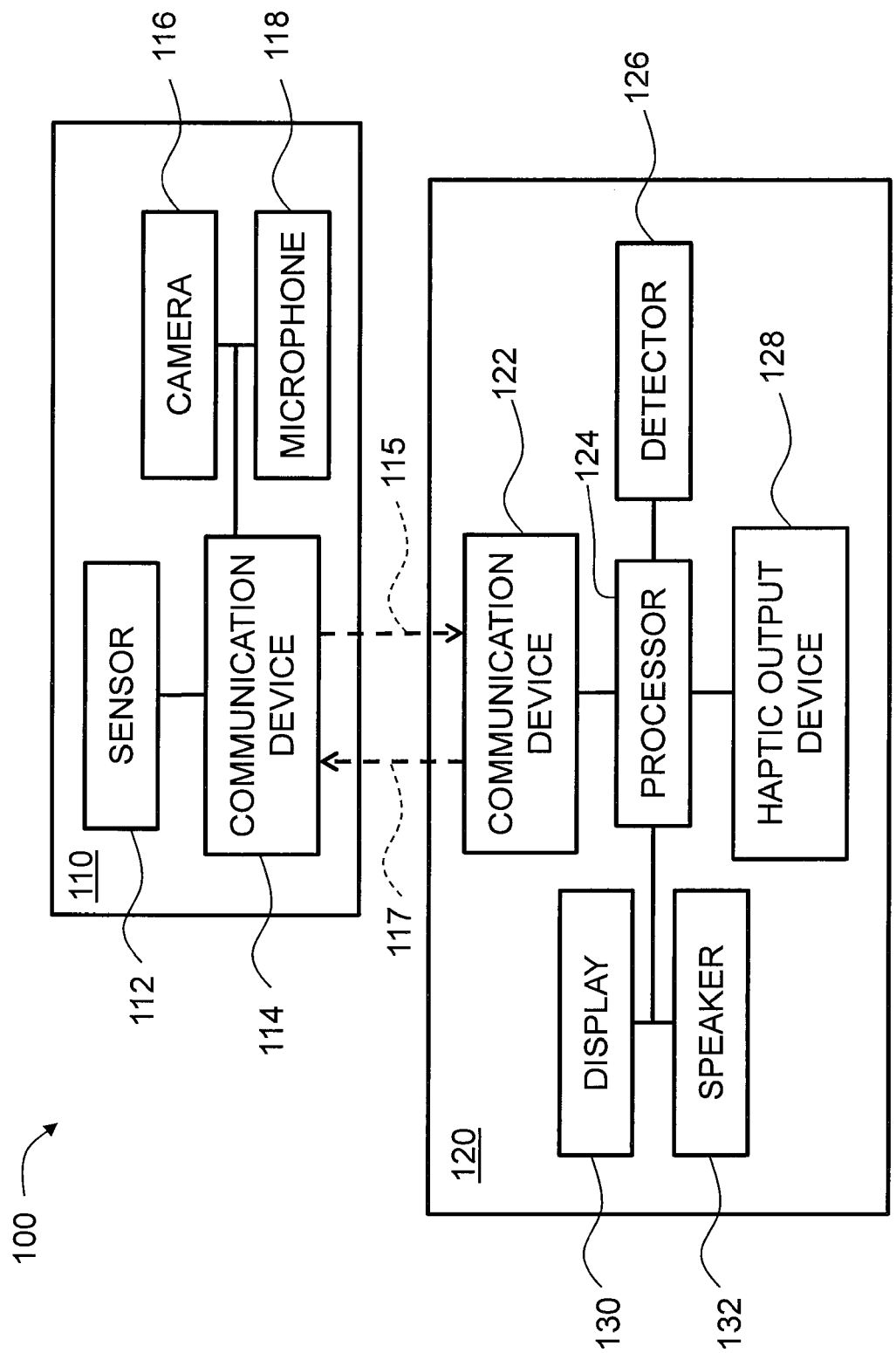
FIG. 1 schematically illustrates a system in accordance with embodiments of the invention.

FIG. 1 illustrates a system 100 in accordance with embodiments of the invention. As illustrated, the system 100 includes a first electronic device 110 and a second electronic device 120 in signal communication with each other. The first electronic device 110 is configured to be placed on an object that is remote from the second electronic device 120, and the second electronic device 120 is configured to be held or worn by a user of the system 100, such as a head-mounted display, as described in further detail below.

The first electronic device 110 includes a sensor 112 and a communication device 114 that includes a transmitter configured to wirelessly transmit signals 115 based on output from the sensor 112. In an embodiment, the communication device 114 may also include a receiver configured to wirelessly receive signals 117. The sensor 112 may be any type of sensor configured to sense a property or condition being experienced by the first electronic device 110. For example, in an embodiment, the sensor 112 may be configured to sense vibrations experienced by the first electronic device 112, and may include, for example, an accelerometer.

The second electronic device 120 includes a communication device 122 that includes a receiver configured to wirelessly receive signals, such as the signals 115 transmitted by the first electronic device 110. The communication device 122 is in signal communication with a processor 124, which is described in further detail below. The signals 115, 117 communicated between the communication device 114 of the first electronic device 110 and the communication device 122 of the second electronic device 120 may be broadcasted using a wireless network. For example, the signals 115, 117 may, for example, be streamed on an internet server. In an embodiment, the signals 115, 117 may be streamed directly to nearby devices 110, 120 using a direct communication protocol such as Bluetooth or RF. Any type of suitable wireless protocol may be used to allow the first electronic device 110 and the second electronic device 120 to communicate with each other.

The second electronic device 120 also includes a detector 126 in signal communication with the processor 124 and configured to determine what remote object the user of the system 100 is looking at, as described in further detail below. The second electronic device 120 also includes a haptic output device 128 in signal communication with the processor 124. The haptic output device 128 is configured to generate a haptic effect to the user.

The haptic output device 128 may include an actuator, for example, an electromagnetic actuator such as an Eccentric Rotating Mass ("ERM") in which an eccentric mass is moved by a motor, a Linear Resonant Actuator ("LRA") in which a mass attached to a spring is driven back and forth, or a "smart material" such as piezoelectric, electro-active polymers or shape memory alloys, a macro-composite fiber actuator, an electro-static actuator, an electro-tactile actuator, and/or another type of actuator that provides a physical feedback such as a haptic (e.g., vibrotactile) feedback. The haptic output device 128 may include non-mechanical or non-vibratory devices such as those that use electrostatic friction (ESF), ultrasonic surface friction (USF), or those that induce acoustic radiation pressure with an ultrasonic haptic transducer, or those that use a haptic substrate and a flexible or deformable surface, or those that provide projected haptic output such as a puff of air using an air jet, and so on.

Figure 2A:
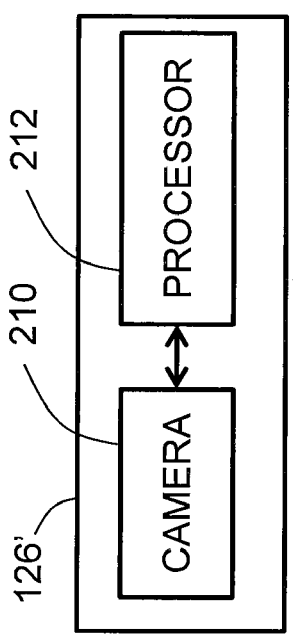
FIGS. 2A and 2B schematically illustrate embodiments of a detector of the system of FIG. 1.
Figure 2B:
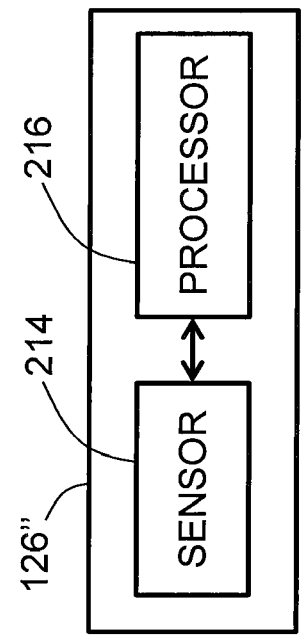

The detector 126 may include any detection means that are used to determine or approximate what remote object the user is focusing on. For example, the detector 126 may be configured to detect an eye gaze of the user of the system 100. Detecting eye gaze of the user provides an indication of the direction the user is looking. FIG. 2A illustrates an embodiment of a detector 126' that may include a camera 210 that may be configured to capture an image of an eye of the user of the system 100, and a processor 212 configured to determine the direction of the eye gaze based on the image. In an embodiment, the processor 212 may be part of the processor 124 of FIG. 1. Image processing techniques to determine eye gaze direction and are well known in the literature and therefore are not described herein. FIG. 2B illustrates an embodiment of a detector 126" that may include a sensor 214 configured to monitor movements of muscles near the eye of the user, and a processor 216 configured to determine the direction of the eye gaze based on the monitored movement. In an embodiment, the sensor 214 may be configured to measure electrical activity of the muscles moving the eyes. In an embodiment, the processor 216 may be part of the processor 124 of FIG. 1.

The above-described embodiments of the detector 126, 126', 126" are not considered to be limiting in any way and other detection means that provide for the determination of a direction of the user's eye gaze may be used in accordance with embodiments of the present invention. For example, in an embodiment, the user's eye gaze direction may be estimated by analyzing the user's body or head posture. In an embodiment, the camera 210 may be mounted on, for example, a head-mounted display, and be configured to have a field of view that is aligned with a direction the head-mounted display is pointing, and therefore the user is looking. An assumption may be made that any object that is within the field of view of the camera attached to the head-mounted display, or in the center of the field of view, is the object of interest for the user.

In an embodiment, the detector 126 may also be configured to determine where the user's current eye gaze direction is focused. This may be accomplished by using image processing techniques to determine the position and the shape of the iris of a user's eye, in combination with a model or stored reference image of the iris. In an embodiment, the user's eye gaze direction may be stored as pitch and yaw angles for each eye. With this information, the depth of field of the user's current gaze may also be determined. In an embodiment, other sensors may be used in addition to the detector 126 to better determine the user's intent or volition, such as sensors that are typically associated with functional magnetic resonance imaging ("fMRI") or electroencephalogram ("EEG"). In an embodiment, a forward facing camera, such as a camera mounted to a head-mounted display, which has been properly calibrated to relate its view to determine what is being gazed at may be used.

In an embodiment, the user may point to the object of interest with his/her finger and the detector 126 may be configured to detect which object the user's finger is pointing at using a forward facing camera and vector analysis techniques. In an embodiment, the field of view of the forward facing camera may be presented to the user via the display 130 and the user may touch or tap a portion of the second electronic device 120 to select the object of interest. The detector 126 may be configured to detect the touch or tap and correlate the touch or tap to the object being displayed by the display 130. For example, if the second electronic device 120 includes a touchscreen, the detector 126 may be part of the touchscreen.

Other communication means that involve a line of sight may also be used to determine what remote object the user is focusing on. For example, in an embodiment, the communication device 114 may also be configured to emit a beam of light, such as with an LED or laser, as part of the signal 115, and the communication device 122 may be configured to detect the beam of light when the second electronic device 120 is pointing almost directly at the first electronic device 110 and the source of the light. When the communication device 122 detects the light, the communication device 122 may also receive the signal from the sensor 112. If the communication device 122 does not detect the light, it may be assumed that the user is not looking at or focusing on the object carrying the first electronic device 110 and therefore there is no need to receive the signal from the sensor 112.

Figure 3:
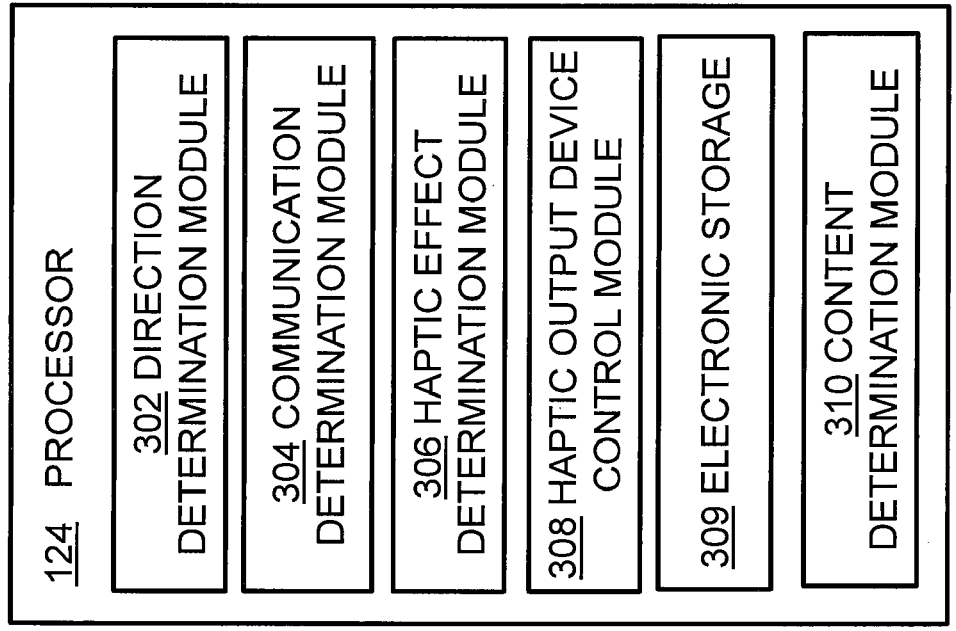
FIG. 3 schematically illustrates a processor of the system of FIG. 1.

FIG. 3 illustrates an embodiment of the processor 124 in more detail. The processor 124 may be configured to execute one or more computer program modules. The one or more computer program modules may include one or more of a direction determination module 302, a communication determination module 304, a haptic effect determination module 306, a haptic output device control module 308, and/or other modules. The processor 124 may be configured to execute the modules 302, 304, 306, and/or 308 by software, hardware, firmware, some combination of software, hardware, and/or firmware, and/or other mechanisms for configuring processing capabilities on processor 124.

It should be appreciated that although modules 302, 304, 306, and 308 are illustrated in FIG. 3 as being co-located within a single processing unit, in embodiments in which the processor 124 includes multiple processing units, one or more of modules 302, 304, 306, and/or 308 may be located remotely from the other modules. For example, the direction determination module 302 may reside in the processors 212, 216 described above. The description of the functionality provided by the different modules 302, 304, 306, and/or 308 described below is for illustrative purposes, and is not intended to be limiting, as any of the modules 302, 304, 306, and/or 308 may provide more or less functionality than is described. For example, one or more of the modules 302, 304, 306, and/or 308 may be eliminated, and some or all of its functionality may be provided by other ones of the modules 302, 304, 306, and/or 308. As another example, the processor 124 may be configured to execute one or more additional modules that may perform some or all of the functionality attributed below to one of the modules 302, 304, 306, and/or 308.

The direction determination module 302 is configured to determine a direction the user is looking and/or the object the user is focusing on based on information from the output signals generated by the detector 126. The information related to the direction the user is looking determined by the direction determination module 302 may describe the direction as a vector in an absolute coordinate system, with respect to other objects, and/or in other contexts. Such information may include, without limitation, coordinates and/or angular relationships, such as pitch and yaw angles, as described above.

The communication determination module 304 is configured to manage the communications between the second electronic device 120 and the first electronic device 110. For example, the communication determination module 304 is configured to determine whether an object that the user is determined to be looking at is transmitting signals, such as the signal 115 transmitted by the first electronic device 110 that are based on a property or condition sensed by the sensor 112. In an embodiment, the communication determination module 304 may be configured to instruct the communication device 122 of the second electronic device 120 to transmit a signal 117 that is received by the first electronic device 110 in order to instruct the first electronic device 110 to begin transmitting the signal 115 that can then be received by the second electronic device 120. In other words, the first electronic device 110 may not continuously transmit the signal 115, but may instead only transmit the signal when the user is determined to be looking at the object carrying the first electronic device 110.

The haptic effect determination module 306 is configured to determine the haptic effect or sensation to be generated by the haptic output device 128 for the user, based on information received from the first electronic device 110 that has passed through the communication device 122. Determining the haptic effect may include determining one or more parameters that include an amplitude, frequency, duration, etc., of the haptic sensation that is to be provided to the user to enhance one or more aspects of the experience provided by the system 100 to the user. For example, if the sensor 112 of the first electronic device 110 is used to sense vibrations being experienced by the object carrying the first electronic device 110, the haptic effect determination module 306 may determine the parameters for the haptic sensation so that the user will experience the vibrations as if he or she is in contact with the object.

The haptic output device control module 308 is configured to control the haptic output device 128 to generate the haptic effect determined by haptic effect determination module 306. This includes communicating the haptic output signal generated by the processor 124 to the haptic output device 128. The haptic effect to be generated may be communicated over wired communication links, wireless communication links, and/or other communication links between the processor 124 and the haptic output device 128. In an embodiment, at least a portion of the functionality attributed to the haptic output device control module 308 may be disposed in a processor carried by the haptic output device 128.

The processor 124 may also include electronic storage 309. The electronic storage 309 may include one or more internally fixed storage units, removable storage units, and/or remotely accessible storage units. The various storage units may include any combination of volatile memory and non-volatile memory. The storage units may be configured to store any combination of information, data, instructions, software code, etc. More particularly, the storage units may include haptic effect profiles, instructions for how the haptic output device 128 is to be driven, or other information for generating haptic effects.

Figure 4:
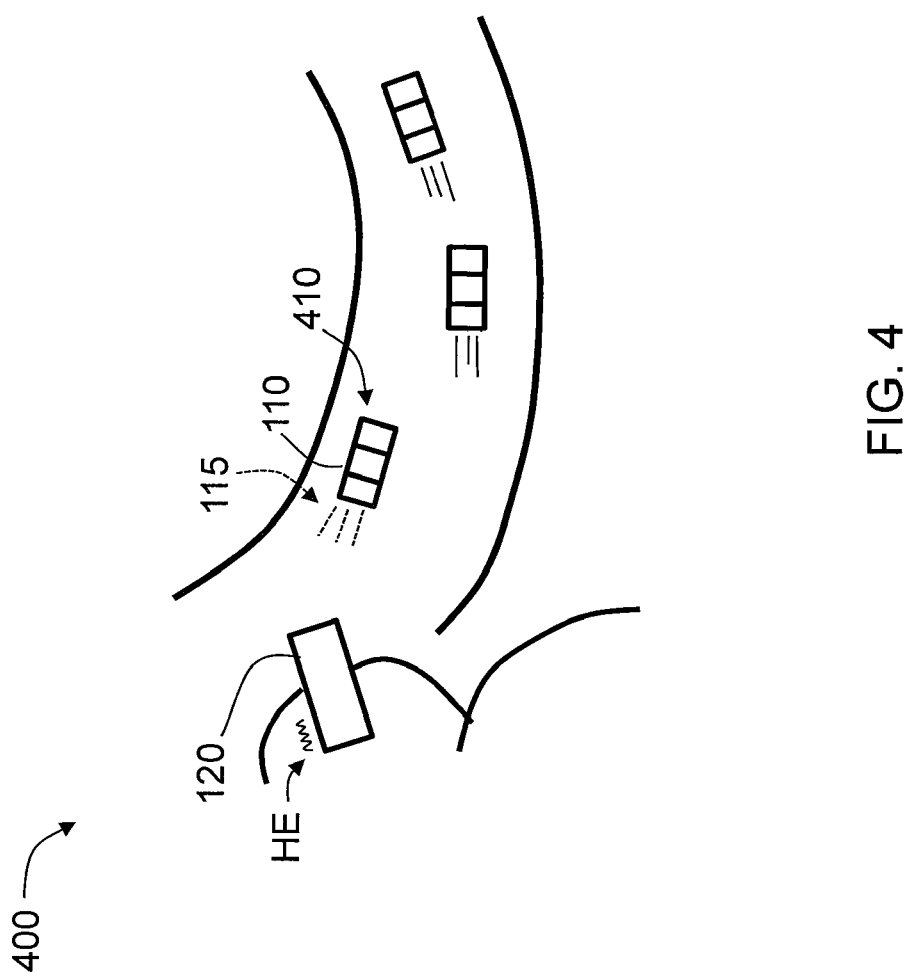
FIG. 4 schematically illustrates an implementation of the system of FIG. 1.

FIG. 4 illustrates an embodiment 400 of the system 100 of FIG. 1. As illustrated, the first electronic device 110 is located in a race car 410 that is racing at the local race track.

Embodiments of the invention may be used with other spectator sports, including but not limited to football, baseball, soccer, basketball, hockey, etc. The illustrated embodiment is not intended to be limiting in any way. A user of the system 100 may wear the second electronic device 120 in the form of a head-mounted display device, as illustrated in FIG. 4. According to embodiments of the invention, the head-mounted display device is configured to detect, with the detector 126, that the user is focusing on the race car 410 that includes the first electronic device 110. The first electronic device 110 in the race car 410 may already be transmitting the signal 115 or may start transmitting the signal 115 upon receiving the signal 117 transmitted by the second electronic device 120, as described above. The signal 115 transmitted by the communication device 114 of the first electronic device 110 corresponds to data streaming from the sensor 112 of the first electronic device 110, which may, for example, be measuring vibrations the race car 410 is experiencing. The communication device 122 in the second electronic device 120 communicates the received signal 115 to the processor 124, which determines what haptic effect should be generated by the haptic output device 128 in the second electronic device 120 so that a haptic effect (or effects) HE indicative of the vibrations experienced by the race car 410 may be generated and felt by the user wearing the head-mounted display device. By generating a haptic effect or effects HE that are based on the vibrations experienced by the race car 410, the user may feel as if he/she is in the race car 410 with the driver, which may enhance the user's experience at the race.

Returning to FIG. 1, in an embodiment, the first electronic device 110 may also include a video capturing device or camera 116 and the second electronic device 120 may also include a visual display 130 configured to display images being captured by the camera 116. The camera 116 may be mounted so that it provides a perspective from the object carrying the first electronic device 110, such as the race car 410 of FIG. 4. For example, the camera 116 may be mounted on the helmet of the race car driver. The signal 115 transmitted by the communication device 114 of the first electronic device 110 may also include the video signal. The processor 124 may also include a content determination module 310, as illustrated in FIG. 3, that is configured to process the video signal and coordinate the content of the video being displayed by the visual display 130 and the haptic effect(s) HE generated by the haptic output device 128 so that the user's experience is as close as possible to the experience of the race car driver.

In embodiment, the first electronic device 110 may also include an audio capturing device or microphone 118 configured to capture sounds in and around the object, such as the race car 410, and the signal 115 transmitted by the communication device 114 may also include the audio signal. The second electronic device 120 may also include an audio output device or speaker 132. The content determination module 310 may also process the audio signal and coordinate the audio being played by the speaker 132 of the second electronic device 120 and the haptic effect(s) HE generated by the haptic output device 128 and/or the video being displayed by the display so that the user's experience is as close as possible to the experience of the race car driver.

In an embodiment, the system 100 may include a plurality of first electronic devices 110 and/or a plurality of second electronic devices 120. In a system 100 that includes a plurality of first electronic devices 110, such as at a car race in which each race car carries the first electronic device 110, the second electronic device 120 being held or worn by the user may be configured to identify a selected source of the signal 115 being communicated by the first electronic device 110. This may be done by matching the strength of a signal 115 being received by the communication device 122 to the direction of the source of the signal 115 in the distance. It may also be done by using other identifiers in the signal 115 that are unique to the particular car carrying the first electronic device 110 and matching the identifiers with physical attributes of the car being looked at by the user, such as a QR code on a race car, the ID number of the car, the color of the car, etc., which may be verified by, for example, matching the direction the user is looking to the view of a forward-facing camera of the second electronic device 120.

In an embodiment, the system 100 may include a plurality of first electronic devices 110 that are each associated with a different player in a team sport, such as for example football. This way, vibrations may be detected from multiple sources and the processor 124 may produce all of the feedback that is available, select the most intense effects, or otherwise determine what feedback to produce based on an algorithm, and provide a corresponding haptic output signal to the haptic output device 128 to generate a haptic effect.

In an embodiment, the first electronic device 110 may not transmit the signal 115 and the second electronic device 120 may be configured to detect events using image or sound processing and automatically augment the events with haptic effects. For example, in an embodiment, a haptic effect corresponding to an engine for a race car may be based on the detected speed of the race car, or a haptic effect corresponding to an impact may be generated when a tackle is detected in a football game.

Figure 5:
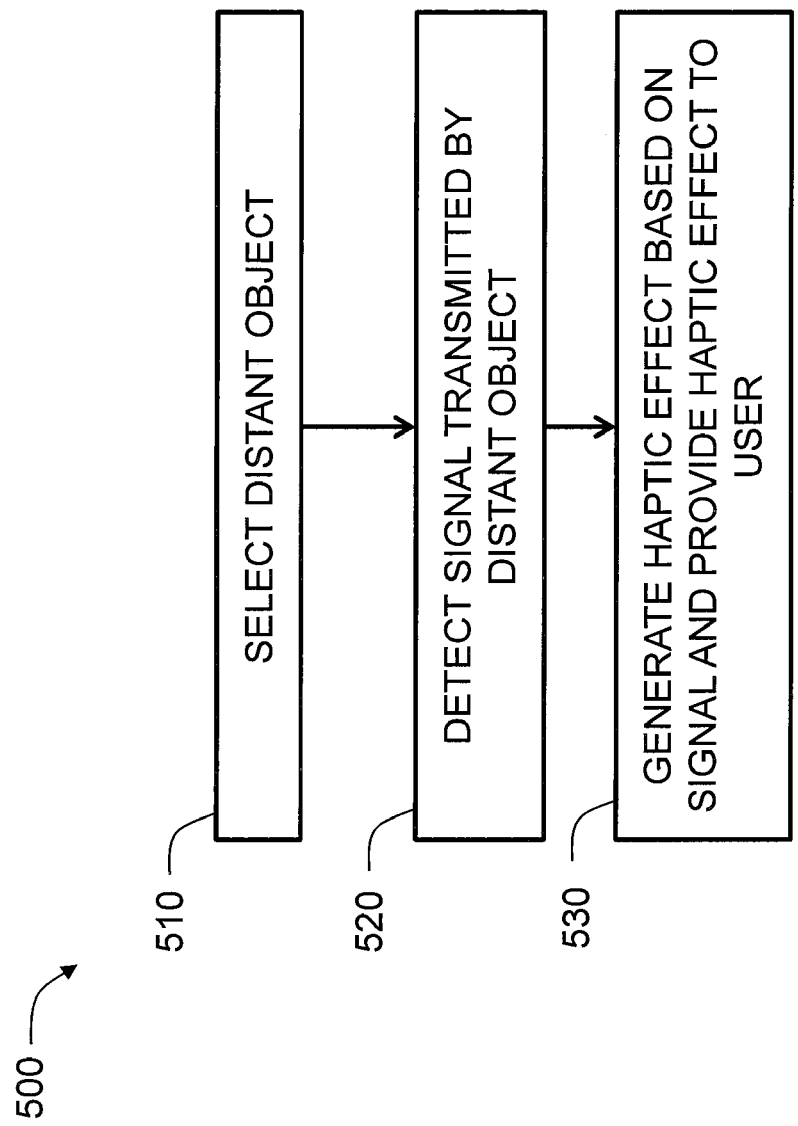
FIG. 5 is a flow chart of a method in accordance with embodiments of the invention.

FIG. 5 illustrates a method 500 in accordance with embodiments of the invention. At 510, a distant object that includes the first electronic device 110 is selected. In an embodiment, the distant object may be selected by detecting the direction a user carrying the second electronic device 120 is looking, when focusing on the distant object, with the detector 126 described above. At 520, the signal 115 being transmitted by the communication device 114 of the first electronic device 110 located on the distant object is detected by the communication device 122 of the second electronic device 120. At 530, at least one haptic effect based on the signal 115 is generated and provided to the user.

Figure 6:
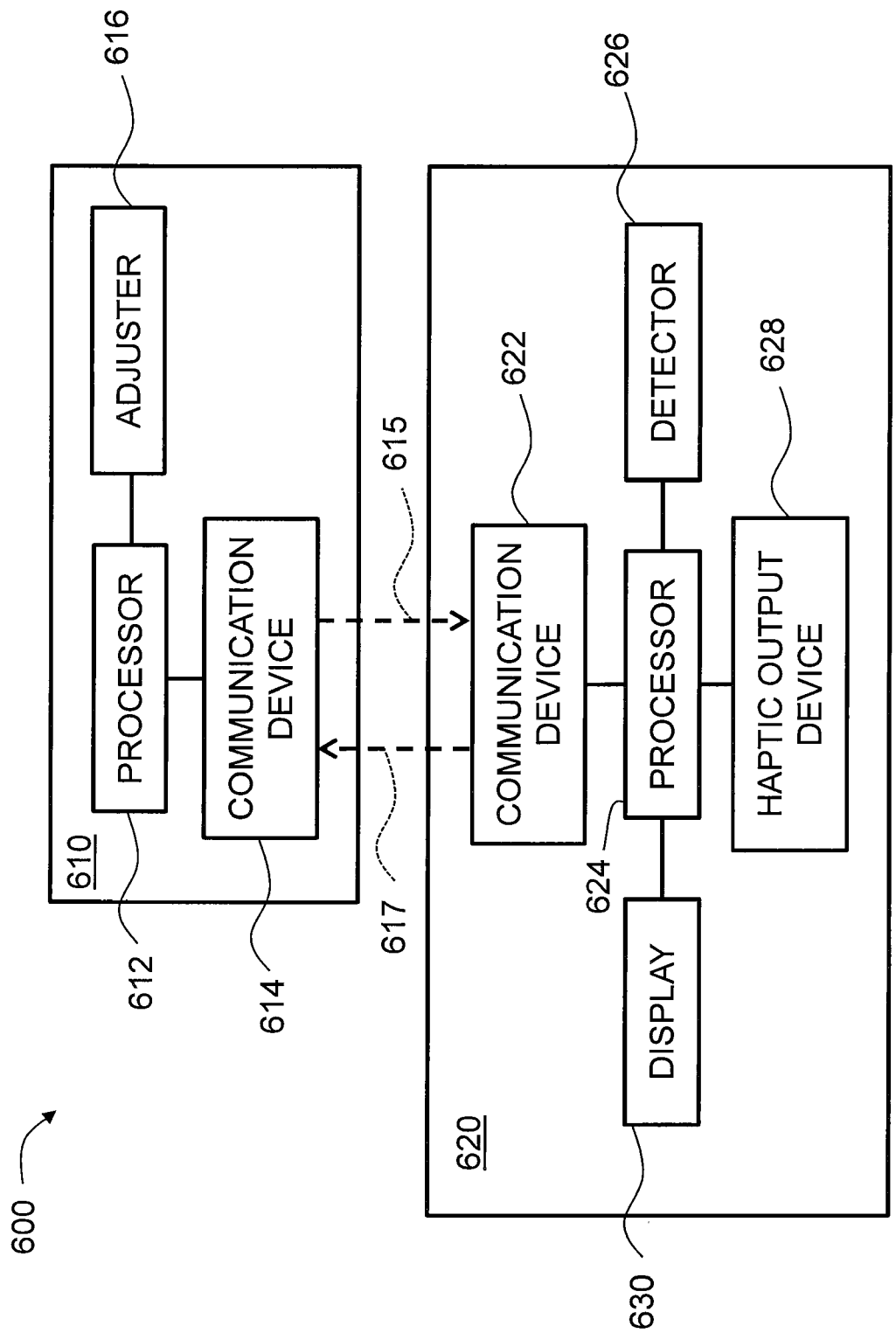
FIG. 6 schematically illustrates a system in accordance with embodiments of the invention.

FIG. 6 illustrates a system 600 according to embodiments of the invention. As illustrated, the system includes a first electronic device 610 and a second electronic device 620 in signal communication with each other. The first electronic device 610 is configured to be placed on an object that is remote from the second electronic device 620, and the second electronic device 620 is configured to be held or worn by a user of the system 600. For example, the second electronic device 620 may be a head-mounted display, a smart watch, a smartphone, a tablet, etc.

The first electronic device 610 includes a processor 612, a communication device 614 that includes a transmitter configured to wirelessly transmit signals 615 and a receiver configured to wirelessly receive signals 617, and an adjuster 616 configured to adjust at least one control setting of the first electronic device 610, as described in further detail below.

The second electronic device 620 includes a communication device 622 that includes a receiver configured to wirelessly receive signals, such as the signals 615 transmitted by the first electronic device 610. The communication device 622 is in signal communication with a processor 624. The processor 624 may have the same or similar modules as the processor 124 illustrated in FIG. 3. The second electronic device 620 also includes a detector 626 in signal communication with the processor 624 and configured to detect the remote object with which the user intends to interact with. For example, the detector 626 may be configured to detect an eye gaze of the user of the system 600, which may provide an indication of the direction the user is looking, as described above.

In an embodiment, the detector 626 may be configured to detect a direction in which the user is pointing as the user points to the remote object by detecting the orientation of the user's finger with a video camera or other suitable means. The detector 626 may be configured to detect a gesture the user makes with a video camera or a depth camera (e.g. KINECT® by Microsoft). The detector 626 may also be in the form of a sensor configured to sense a touch input of the user, which may be part of a touchpad or smartphone. In an embodiment, the detector 626 may include an accelerometer configured to detect motion of the user's head, hand or finger, depending on the location of the detector 626. In an embodiment, the detector 626 may be an audio detector that is configured to detect a voice command that includes identifying information. Any other suitable detector that may be configured to detect the user's input as to which object the user would like to interact with may be used.

The second electronic device 620 also includes a haptic output device 628 in signal communication with the processor 624. The haptic output device 628 is configured to generate a haptic effect to the user and may have any configuration described above with respect to the haptic output device 128 of the system 100 illustrated by FIG. 1. The haptic effect may take different forms, such as those described in U.S. patent application Ser. No. 14/106,275, which was filed on Dec. 13, 2013 and is incorporated by reference herein. For example, the haptic feedback may be delivered through the second electronic device 620 through means such as vibrations, squeezing, or tapping when the second electronic device 620 is in the form of a head-mounted display. In an embodiment, the haptic feedback may be delivered through wearable device, such as a bracelet, glove or ring. In an embodiment, the haptic feedback may be delivered through a smartphone, tablet or other handheld device, such as a wand.

As also illustrated by FIG. 6, the second electronic device 620 may also include a display 630 that is configured to display an image representative of a zoomed-in version of the remote object that includes the first electronic device 610 when the detector 626 detects that the user is looking at the remote object. For example, the display 630 may be configured to display an image of the remote object as a virtual object or widget in an augmented reality environment. When the second electronic device 620 is a head-mounted display, the image may be displayed so that it appears to be within grasp of the user and the user can reach out and perform a gesture as if the user is touching the remote object.

In order to establish a communication channel between the first electronic device 610 and the second electronic device 620, the user may look or point at the object the user wants to interact with, and may optionally perform a specific gesture, such as blinking or tapping a touchpad, to indicate which object the user wants to interact with. To navigate between different objects or targets, the user may use input such as free-air gestures or head movement, or the user may use a conventional user interface, such as a smartphone application. In an embodiment, the user may feel virtual representations of different objects in an augmented reality scenario and immediately determine whether the correct object has been selected, as each object may transmit a distinct haptic signal so as to produce a distinct haptic feedback with the haptic output device 628.

The processor 624 may be programmed with a look-up table or database that lists objects having the functionality provided by the system 600, i.e. objects that include the first electronic device 610, as well as the operations and control adjustments that are available for a particular object. The processor 624 may also be programmed to include identifiers of the objects that include the first electronic device 610. For example, images of the object may be stored so that the object may be identified through its visual appearance, the object may include a visual marker that matches a visual marker stored in the processor, or the signal 615 emitted by the first electronic device 610 may include a signature that is unique to the object. When the object the user desires to interact with is identified by the second electronic device 620, the object may be compared to a database of known objects, and then matched to a list of capabilities. In an embodiment, the first electronic device 610 may be configured to communicate its capabilities and/or preferred user interface as part of the signal 615 that the first electronic device 610 transmits.

After the communication channel has been established between the first electronic device 610 and the second electronic device 620, the detector 626 may be configured to detect a gesture made by the user that corresponds to an adjustment to be made to the adjuster 616 of the first electronic device 610. In an embodiment, the detector 626 may be part of the first electronic device 610. For example, in an embodiment, the detector 626 may include a depth sensor configured to sense when the user is making a gesture within a certain range of the second electronic device 626, which would indicate that the gesture correspond to an adjustment to be made to the adjuster 616 of the first electronic device 610.

The processor 624 may process the signal output by the detector 626 and send a corresponding signal to the adjuster 616 of the first electronic device 610 so that the adjustment the user is making via the gesture is actually made to the remote object. At the same time, the processor 624 may send a signal to the haptic output device 628 so that a haptic effect may be generated to provide a haptic sensation to the user so that the user feels as though he or she is actually interacting with and making an adjustment to a control of the remote object. For example, the haptic effects that may be generated by the haptic output device may mimic the physical sensation of turning a dial, pressing a button, moving a slider, flicking a switch, etc. In embodiments that use the display 630 to display augmented reality environment, the processor 624 may process the signal output by the detector 626 and send a corresponding signal to the adjuster 616 of the first electronic device 610 so that the adjustment the user is making to the virtual object or widget is actually made to the remote object.

Figure 7:
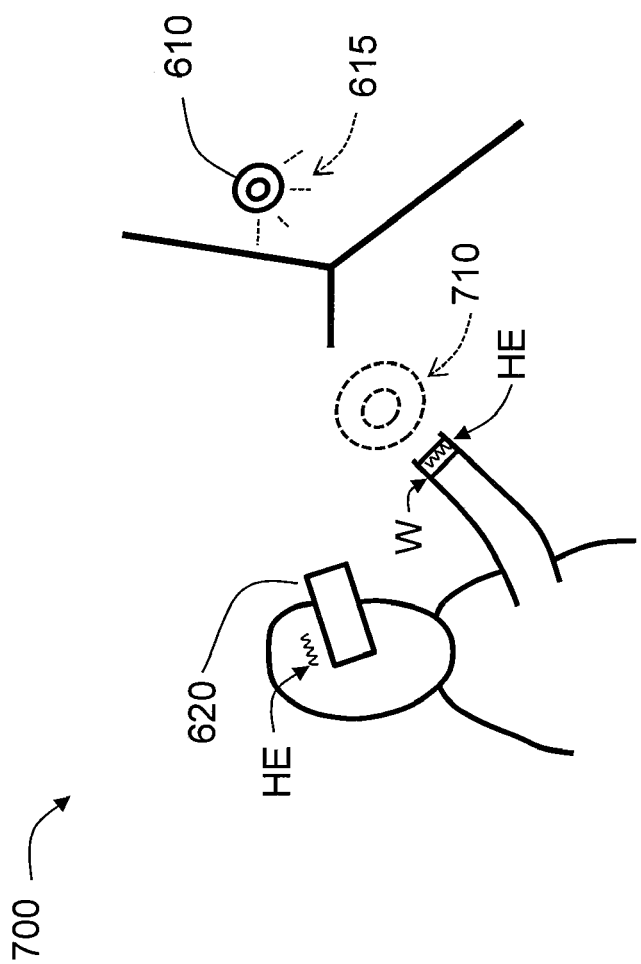
FIG. 7 schematically illustrates an implementation of the system of FIG. 6.

FIG. 7 illustrates an embodiment 700 of the system 600. The user of the system 600 may desire to change a temperature setting of the first electronic device 610, which may be a thermostat on the wall (i.e. the remote object described above) without having to go to the thermostat and manually adjust the dial of the thermostat. The user may wear the second electronic device 620 as a head-mounted display, for example. As the user looks at the thermostat on the wall, the detector 626 detects that he/she is looking at the thermostat, which is transmitting the signal 615 via the first electronic device 610. The second electronic device 620 receives the signal 615 and displays a virtual thermostat 710 via the display 630 such that the virtual thermostat 710 appears in front of the user. The user may then reach out towards the virtual thermostat 710 with his/her hand and make a gesture as if the user is turning a dial of the thermostat. The haptic output device 628 may output haptic feedback that feels like clicks corresponding to the adjustment being made to the dial. In an embodiment, the haptic output device 628 may be located in a wristband W also worn by the user. At the same time or substantially the same time, the transmitter of the communication device 622 may send a signal 617 to the receiver of the communication device 614 of the first electronic device 610 located at the thermostat to indicate that the adjuster 616 should adjust the setting of the thermostat by the amount indicated by the gesture provided by the user. For example, the user may make a gesture that corresponds with slowly turning the dial of the virtual thermostat by 4 degrees and the haptic output device 628 may generate a haptic effect HE that simulates 4 clicks, one for each degree. At the same time or substantially the same time, the adjuster 616 of the first electronic device 610 adjusts the thermostat by 4 degrees.

Other distant or remote objects may also be interacted with using embodiments of the invention. For example, in an embodiment, the object may be a light switch or a button and the gesture made by the user may simulate a flick of the light switch or press of the button. In accordance with embodiments of the invention, haptic feedback that corresponds to the gesture the user makes when interacting with the object itself may be provided to enhance feeling that the actual object is being interacted with, even though the user is not touching the object.

FIG. 8 illustrates a method 800 according to an embodiment of the invention. At 810, a distant object that includes the first electronic device 610 is selected for adjusting. The selection may be detected by the detector 626, as described above. At 820, a gesture made by the user to adjust the control of the distant object via the adjuster 616 is detected. At 830, the control of the distant object is adjusted in accordance with the gesture made by the user. At 840, at least one haptic effect that is representative of the adjustment is generated and provided to the user.

Embodiments of the invention described above make it possible to feel and interact with objects that are too far to be touched directly, while maintaining the same experience as if the objects are being touched directly. For example, embodiments of the invention allow the user to feel as if the user is the driver of a car, or a professional athlete doing a stunt as the user looks at them in a distance, provided that the driver of the car or professional athlete has the first electronic device described above broadcasting a signal that can be converted into a haptic signal to drive a haptic output device being held or worn by the user. This may increase the feeling of "being there." Embodiments of the invention may allow the user to see from the perspective of the object of attention, such as the race car driver or perhaps a remote controlled vehicle if properly equipped with the first electronic device that includes a camera. Embodiments of the invention described above also allow a user of the system to interact with a control of an object that is visible but too far to be touched in a manner that substantially maintains the same interaction as if the physical control is being used.

The embodiments described herein represent a number of possible implementations and examples and are not intended to necessarily limit the present disclosure to any specific embodiments. Instead, various modifications can be made to these embodiments as would be understood by one of ordinary skill in the art. Any such modifications are intended to be included within the spirit and scope of the present disclosure and protected by the following claims.

What is claimed is:

1. A system comprising:
an electronic device comprising:
an eye-gaze sensor;
a wireless receiver;
one or more processors configured to:
receive one or more eye-gaze sensor signals from the eye-gaze sensor;
determine a focus object based on the one or more eye-gaze sensor signals, the focus object being a real-world object that a user of the electronic device is determined to be focused on;
receive, using the wireless receiver, one or more wireless signals from a source electronic device indicating a sensed condition or a sensed property of the focus object, the source electronic device corresponding to the focus object and configured to sense the sensed condition or the sensed property of the focus object;
generate a haptic signal based on the condition or property of the focus object; and
a haptic output device configured to receive the haptic signal and generate a haptic effect to the user.

2. The system according to claim 1, wherein the eye-gaze sensor comprises a camera configured to capture an image of an eye of the user, and an image processor configured to determine a direction of an eye gaze of the user based on the image.

3. The system according to claim 1, wherein the source electronic device is configured to sense vibrations or deformations of the focus object and wherein the sensed condition or the sensed property indicate the sensed vibrations or deformations.

4. The system according to claim 3, wherein the haptic effect simulates the sensed vibrations or deformations.

5. The system according to claim 1, wherein the source electronic device further comprises a camera configured to output a video stream, the video stream being part of the signal, and wherein the electronic device further comprises a display configured to display the video stream.

6. The system according to claim 1, wherein the electronic device is a head-mounted display.

7. The system according to claim 6, wherein the eye-gaze sensor comprises a camera mounted on the head-mounted display, the camera having a field of view aligned with a direction the head-mounted display is pointing.

8. A method comprising:
receiving, by an electronic device and from an eye-gaze sensor, one or more eye-gaze sensor signals from the eye-gaze sensor;
determining, by the electronic device, a focus object based on the one or more eye-gaze sensor signals, the focus object being a real-world object that a user of the electronic device is determined to be focused on;
receiving, by the electronic device and using a wireless receiver, one or more wireless signals indicating a sensed condition or sensed property experienced by the focus object from a source electronic device, the source electronic device corresponding to the focus object and configured to sense the sensed condition or the sensed property of the focus object and to transmit the one or more wireless signals;
generating, by the electronic device, a haptic signal based on the sensed condition or the sensed property of the focus object; and transmitting the haptic signal to a haptic output device to output a haptic effect.

9. The method according to claim 8, wherein the eye-gaze sensor comprises a camera and wherein determining the object that the user of the electronic device is focusing on comprises:
   capturing, by the camera, an image of an eye of the user; and
   determining a direction of an eye gaze of the user based on the image.

10. The method according to claim 8, wherein the source electronic device is configured to sense vibrations or deformations of the focus object, and wherein the sensed condition or the sensed property indicate the sensed vibrations or deformations.

11. The method according to claim 10, wherein the haptic effect simulates the sensed vibrations or deformations.

12. The method according to claim 8, further comprising:
   receiving, from a camera of the source electronic device, a video stream, wherein the one or more wireless signals include the video stream; and
   displaying, by a display of the electronic device, the video stream.

13. The method according to claim 8, wherein the electronic device is a head-mounted display.

14. The method according to claim 13, wherein the eye-gaze sensor comprises a camera mounted on the head-mounted display, the camera having a field of view aligned with a direction the head-mounted display is pointing.

15. A non-transitory computer-readable medium storing program code executable by a processor, the program code configured to cause the processor to:
   receive, by an electronic device and from an eye-gaze sensor, one or more eye-gaze sensor signals from the eye-gaze sensor;
   determine a focus object based on the one or more eye-gaze sensor signals, the focus object being a real-world object that a user of the electronic device is determined to be focused on;
   receive, by the electronic device and using a wireless receiver, one or more wireless signals indicating a sensed condition or sensed property experienced by the focus object from a source electronic device, the source electronic device corresponding to the focus object and configured to sense the sensed condition or the sensed property of the focus object and to transmit the one or more wireless signals;
   generate a haptic signal based on the sensed condition or the sensed property of the focus object; and
   transmit the haptic signal to a haptic output device to output a haptic effect.

16. The non-transitory computer-readable medium according to claim 15, wherein the eye-gaze sensor comprises a camera and wherein the program code is further configured to cause the processor to:
   capture, using the camera, an image of an eye of the user; and
   determine a direction of an eye gaze of the user based on the image.

17. The non-transitory computer-readable medium according to claim 15, wherein the source electronic device is configured to sense vibrations or deformations of the focus object, and wherein the sensed condition or the sensed property indicate the sensed vibrations or deformations.

18. The non-transitory computer-readable medium according to claim 17, wherein the haptic effect is configured to simulate the sensed vibrations or deformations.

19. The non-transitory computer-readable medium according to claim 15, wherein the program code is further configured to cause the processor to:
   receive a video stream from the source electronic device, wherein the one or more wireless signals include the video stream; and
   cause a display of the video stream.

20. The non-transitory computer-readable medium according to claim 15, wherein the electronic device is a head-mounted display.

21. The non-transitory computer-readable medium according to claim 20, wherein the eye-gaze sensor comprises a camera mounted on the head-mounted display, the camera having a field of view aligned with a direction the head-mounted display is pointing.

* * * * *